(12) United States Patent
Cho

(10) Patent No.: US 7,725,133 B2
(45) Date of Patent: May 25, 2010

(54) MOBILE WIRELESS COMMUNICATION DEVICES WITH QUICK-SEND FEATURES AND METHODS THEREFOR

(75) Inventor: Han S. Cho, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 1992 days.

(21) Appl. No.: 09/941,265

(22) Filed: Aug. 28, 2001

(65) Prior Publication Data

US 2002/0142807 A1    Oct. 3, 2002

Related U.S. Application Data

(60) Provisional application No. 60/280,224, filed on Mar. 30, 2001.

(51) Int. Cl.
  *H04B 1/38* (2006.01)
  *H04M 1/00* (2006.01)
  *H04M 3/00* (2006.01)

(52) U.S. Cl. ............... 455/564; 455/73; 455/550.1; 379/355.01; 379/355.02; 379/355.05; 379/355.07; 379/355.08; 379/355.09; 379/355.1

(58) Field of Classification Search ........... 455/564, 455/550.1, 73; 379/355.01, 355.02, 355.05, 379/355.07, 355.08, 355.09, 355.1
  See application file for complete search history.

(56) References Cited

U.S. PATENT DOCUMENTS

| | | | |
|---|---|---|---|
| 5,491,745 A | | 2/1996 | Roeder |
| 5,507,021 A | | 4/1996 | Siegle |
| 5,535,258 A | * | 7/1996 | Joglekar et al. ............ 455/564 |
| 5,710,810 A | * | 1/1998 | Tiilikainen ............ 379/355.09 |
| 5,754,602 A | | 5/1998 | Landry et al. |
| 5,790,652 A | | 8/1998 | Gulley et al. |
| 5,926,769 A | * | 7/1999 | Valimaa et al. ............ 455/564 |
| 5,977,887 A | | 11/1999 | Grimmett |
| 6,009,444 A | | 12/1999 | Chen |
| 6,160,997 A | | 12/2000 | Oberlaender |

(Continued)

FOREIGN PATENT DOCUMENTS

EP    0457077    4/1991

(Continued)

OTHER PUBLICATIONS

Partial translations of JP-06276312 (R__), JP-07162498 (R__) and JP-2001045166 (R__) provided by Applicant's Japanese patent associate.

(Continued)

*Primary Examiner*—Patrick N. Edouard
*Assistant Examiner*—Matthew W Genack
(74) *Attorney, Agent, or Firm*—Roland K. Bowler, II

(57) ABSTRACT

A mobile wireless communication device like a cellular handset includes multiple communication addresses stored in its memory. Each address is associated with one or more inputs of an input key. For example a first telephone number is associated with a single input of a particular key, and a second telephone number may be associated with two sequential inputs of the same key. The communication address is transmitted from the wireless communication device upon entering the one or more key inputs associated therewith and upon maintaining a last of the sequential key inputs for a predetermined time interval.

1 Claim, 3 Drawing Sheets

U.S. PATENT DOCUMENTS

| | | |
|---|---|---|
| 6,195,428 B1 | 2/2001 | Maruyama |
| 6,370,518 B1 | 4/2002 | Payne et al. |
| 6,614,892 B1 | 9/2003 | Hashimoto et al. |
| 2002/0091754 A1* | 7/2002 | Jang et al. .................... 709/203 |
| 2003/0017839 A1* | 1/2003 | Mager ......................... 455/550 |

FOREIGN PATENT DOCUMENTS

| | | |
|---|---|---|
| JP | 06276312 | 9/1994 |
| JP | 07162498 | 6/1995 |
| JP | 2001045166 | 2/2001 |

OTHER PUBLICATIONS

Japanese Patent Office—Office Action; Nov. 20, 2007 for counterpart Japanese Application No. 2002-578983 & English language translation (6 pages).

* cited by examiner

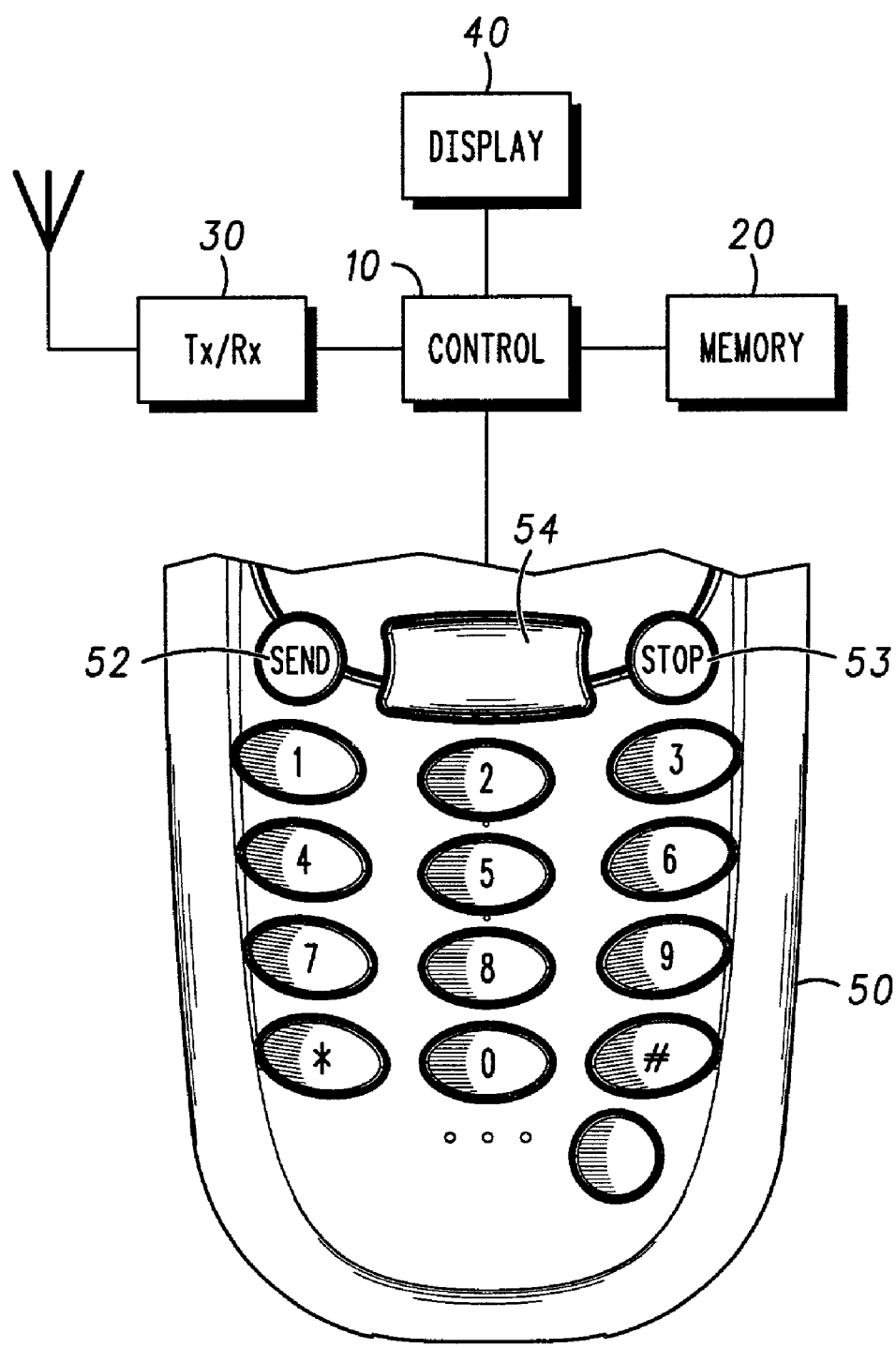
F I G . 1

| IDENTIFIER | ADDRESS | KEY INPUT(S) |
|---|---|---|
| HAN | WORK | 1 |
| | HOME | 11 |
| | CELL | 111 |
| | E-MAIL | 1111 |
| OTHER PERSON | WORK | 2 |
| | PAGER | 22 |
| | HOME | 222 |
| | E-MAIL | 2222 |
| | CELL | 22222 |
| ⋮ | ⋮ | ⋮ |

*FIG.4*

| | | | |
|---|---|---|---|
| ADDRESSES 0-99 | 111 | 1111 | ••• |
| | 222 | 2222 | ••• |
| | | | |
| | | | |
| | ⋮ | ⋮ | ••• |

*FIG.5*

MOBILE WIRELESS COMMUNICATION DEVICES WITH QUICK-SEND FEATURES AND METHODS THEREFOR

This application claims benefit of 60/280,224 Mar. 30, 2001.

FIELD OF THE DISCLOSURE

The present disclosure relates generally to wireless communication devices and, more particularly to mobile wireless communication devices having quick-send features and methods therefor.

BACKGROUND

Quick dialing features are known generally in cellular telephones. The Motorola StarTAC cellular telephones, for example, include a "Turbo Dial" feature that allows users to dial telephone numbers stored in memory locations 1-9 by merely depressing and holding a corresponding one of the input keys for a specified time interval. In the Motorola StarTAC phones, telephone numbers are associated with numeric input keys 1-9 by designating the corresponding memory location, i.e., locations 1-9, in which the telephone number is stored when the number is entered initially. Memory location 1 corresponds to numeric key 1, etc.

The Nokia 6100 series of cellular handsets, by Nokia Mobile Phones Limited, include a "1-touch dialing" feature. In the Nokia handsets, telephone numbers are associated with input keys by entering the "1-touch dialing" mode, whereupon previously stored telephone numbers may be assigned to corresponding alphanumeric input keys on the keypad. Thereafter, stored telephone numbers may be dialed by depressing and holding the corresponding input key associated therewith for a specified time interval.

In known telephones having speed dialing features, the number of telephone numbers that may be assigned to alphanumeric input keys is limited by key availability, e.g., usually keys 1-9 in cellular telephones. Additionally, some phones reserve one or more numeric keys for the assignment of specific numbers. In the Nokia 6100 series handsets, for example, input key 1 is reserved for the user's voice-mail number and input key 9 is reserved for speed dialing an emergency number.

U.S. Pat. No. 5,710,810 entitled "Quick Dialing In A Mobile Phone", assigned to Nokia Mobile Phones Limited, discloses a quick dialing feature that allows users to associate several telephone numbers, e.g., "work", "home", "mobile", etc., with a particular name stored in memory. This supposed quick dialing feature however requires multiple inputs and scrolling to dial one of several telephone numbers stored in association with a particular name. Users must first display a list of stored names, and then select a name by scrolling through the displayed list, whereupon numbers or indicia thereof like "home" "work", etc., associated with the selected name are displayed on a touch sensitive display. One of the displayed numbers may then be dialed by depressing the corresponding portion of the touch sensitive display, once or twice with a finger or an input device, associated with the desired number.

The various aspects, features and advantages of the present disclosure will become more fully apparent to those having ordinary skill in the art upon careful consideration of the following Detailed Description with the accompanying drawings described below.

BRIEF DESCRIPTION OF THE DRAWINGS

FIG. 1 is an exemplary schematic block diagram of a mobile communication device.

FIG. 4 illustrates several communication addresses of different individuals, each associated with corresponding key inputs.

FIG. 5 illustrates a memory address assignment configuration according to an exemplary embodiment of the invention.

DETAILED DESCRIPTION

Figure 2:
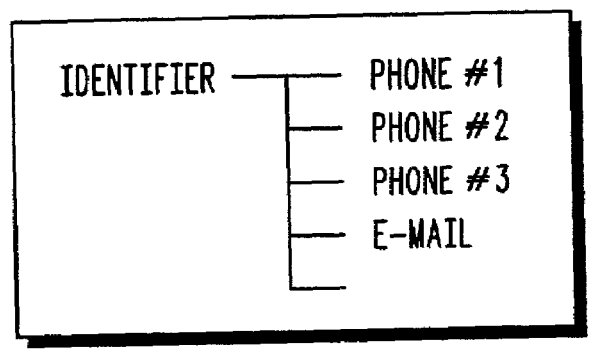
FIG. 2 illustrates several communication addresses associated with a common identifier, for example an individual's name.

The disclosure relates generally to wireless communications devices including mobile wireless communication devices, for example cellular telephones, pagers, personal digital assistants, wireless communication enabled laptop and notebook computers and other electronic devices.

FIG. 1 illustrates an exemplary schematic block diagram of a wireless communication device comprising generally a processor or micro-controller 10 coupled to memory 20, a transmitter/receiver 30, a display 40, and an input keypad 50 having a plurality of input keys.

The keypad of the exemplary embodiment is typical of that on a cellular handset and comprises a plurality of numeric input keys 0-9, function keys, including a "send" key 52 and a "stop" key 53, and a multi-position input device like thumb wheel or a scrolling device 54. In some embodiments, the numeric keys may also be capable of alphanumeric input. In other embodiments, the keypad includes discrete alphabetic input keys and numeric keys, for example as is common in wireless enabled laptop computers, some two-way pagers and other devices.

The memory is generally capable of storing information on the wireless communication device, including information to be transmitted therefrom. In one embodiment, the information is one or more communication addresses and in some embodiments a related identifier, for example a name or some identification code associated therewith. In the exemplary embodiment, the communication addresses include telephone and pager numbers, voice-mail box numbers, e-mail addresses, network addresses, like World Wide Web (WWW) addresses and File Transfer Protocol (FTP) Uniform Resource Locator (URLs) addresses, among many others.

In one embodiment, multiple communication addresses are stored on the wireless communication device in association with a common identifier, for example an individual's name. FIG. 2 illustrates several communication addresses stored in association with an identifier in the memory of the wireless communication device. In one embodiment, each identifier and the corresponding communication addresses are stored in a common memory location, or address.

In another embodiment, each communication address is stored with a variation of the identifier in separate memory locations, for example "Han-W", "Han-H", "Han-C" and "Han-E", corresponding to work, home and cell phone numbers and an e-mail address, respectively, of an individual named Han. In this embodiment, the identifier "Han" is common to all of the communication addresses.

Figure 3:
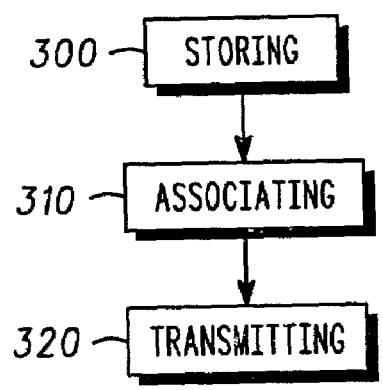
FIG. 3 illustrates a schematic flow diagram for associating information stored in a wireless communication device, for example communication addresses, with one or more inputs of the same input key for quick transmission.

In FIG. 3, at block 300, information is entered into or stored by the phone, for example by entering the information when the communication device is in an input mode. In one embodiment, for example, the user enters a number and if desired a corresponding identifier in a particular memory address location by specifying the memory address associated with the particular input. In another embodiment, the user merely enters name and communication address information, without specifying a particular memory address whereupon the information is stored in the next available memory address. In this latter embodiment, the burden of having to specify the particular memory address were the information is stored is on the software.

In FIG. 3, at block 310, information stored on the wireless communication device is associated with at least one input from an input key on the wireless communication device. In one embodiment, the association is made manually upon entering information in a particular memory address, for example, during a data input mode, as discussed above. In another embodiment, the information is associated with the input key after the information is stored in memory, without the user specifying the memory address in which the information is stored. In the latter embodiment, the information may be associated with the input by entering a "set-up" mode, similar to the "1-touch dialing" mode of the Nokia 6100 series handsets. The input key may be associated with the assigned information by a look-up table or by other means, or the information may be moved from its original memory address location to the memory address location corresponding to the number on the input key upon assignment of the communication address to a particular input key or several inputs thereof.

In one embodiment, information to be transmitted from the wireless communication device is associated with a plurality of at least two sequential inputs of the same input key on the wireless communication device. In another embodiment, a first communication address is associated with a single input of an input key and a second communication address is associated with two inputs of the same input key as the first communication address. In other embodiments, another communication address is associated with three inputs of the same input key as the first and second communication addresses. Additional addresses may be associated with additional inputs of the same input key.

In one application, a plurality of communication addresses related to the same individual are all associated with the same input key, for example, the "6" key of the wireless communication device, and another plurality of input addresses of another individual are associated with another input key, for example, the "7" key. The multiple communication addresses associated with a particular individual are distinguished by the number of key inputs. For example, in one embodiment, a first communication address is associated with one input of an input key, a second communication address is associated with two inputs of the same input key, and a third communication address is associated with three inputs of same input key, etc.

FIG. 4 illustrates in tabular form several communication addresses for the individual "HAN" and the associated inputs of the numeric key "1". The communication addresses of another person are associated with corresponding inputs of the numeric key "2", and so on. The communication addresses related to other identifiers may be associated with corresponding inputs of other keys, including alphabetic or numeric or alphanumeric keys, or even function keys. In cellular telephone handset applications, the communication addresses are associated with alphanumeric keys 0-9, since some users may already be accustomed to associating telephone number with numeric input keys.

In one embodiment, the number of inputs of an input key corresponds to the decimals of the memory location address. In FIG. 4, for example, the "Work" number of "HAN" is stored in memory address location "1", the "Home" number of "HAN" is stored in memory address location "11", and the "e-mail" address of "HAN" is stored in memory location "1111". The memory address location associated with a particular communication address may be specified by the user during data entry, or the communication address data may be moved from its initial memory address location to the memory address location corresponding to the particular key inputs upon making the association. This may be performed under control of software of the wireless communication device.

In applications where memory is relatively limited, for example, where there are only addresses 0-99, the address "111", "1111" "222" and "2222", etc. corresponding to communication address assignments that exceed address 99 may be arbitrarily assigned to other portions of memory. FIG. 5 illustrates a portion of physical memory having addresses 0-99, and additional unordered addresses "111", "1111", "222", "2222", etc., which only marginally increases the size of the memory. Alternatively, memory addresses within the range 0-99 may be reassigned new addresses, for example memory addresses "12" and "13" may be reassigned the addresses "111" and "1111", respectively.

FIG. 3 illustrates, at block 320, transmission of the communication addresses associated with particular key inputs. In one embodiment, transmission of a communication address or other information from the wireless communication device is performed by inputting and maintaining the last of the key inputs for a minimum input time interval. Where a single key input is associated with a particular communication address, for example the "1" input key in FIG. 4, the associated "work" telephone number for "HAN" is transmitted upon depressing and holding the "1" key for a predetermined time interval. Depressing the input key for a predetermined time interval is functionally equivalent to the "send" function on some cellular handsets. Continuing with the example, the "Home" telephone number for "HAN" is transmitted by sequentially depressing the "1" key twice, within a software specified time interval that would capture two sequential inputs by most users, and then maintaining the "1" key input for another predetermined time interval.

While the present disclosure and what is considered presently to be the best mode thereof have been described in a manner that establishes possession thereof by the inventor and that enables those of ordinary skill in the art to make and use the same, it will be understood and appreciated that there are many equivalents to the exemplary embodiments disclosed herein and that myriad modifications and variations may be made thereto without departing from the scope and spirit of the invention, which is to be limited not by the exemplary embodiments but by the appended claims.

What is claimed is:

1. A mobile wireless communication device, comprising:
a processor;
a memory for storing a plurality of communication addresses;
an input pad having a plurality of input keys;
means for associating a first communication address stored in memory with first and second sequential inputs of one of the input keys,
means for transmitting the first communication address from the mobile wireless communication device upon entering the sequential key inputs associated therewith and upon maintaining a last of the sequential key inputs for a predetermined time interval;

means for associating a second communication address stored in memory with a single input of the same input key associated with the first communication address, means for transmitting the second communication address from the mobile wireless communication device upon entering the single key input associated therewith and upon maintaining the key input for a predetermined time interval, the input key is a numeric input key having a single numeral, the second communication address stored in a memory location identified by the numeral of the numeric input key, the first communication address stored in a memory location identified by juxtaposition of the numeral of the numeric input key in first and second adjacent decimal positions.

* * * * *